(12) United States Patent
Tsao et al.

(10) Patent No.: US 9,144,124 B2
(45) Date of Patent: Sep. 22, 2015

(54) METHOD AND APPARATUS FOR DRIVING LIGHT EMITTING DIODE

(71) Applicant: PRINCETON TECHNOLOGY CORPORATION, New Taipei (TW)

(72) Inventors: Ming-Yuan Tsao, New Taipei (TW); Ko-Han Chen, New Taipei (TW)

(73) Assignee: Princeton Technology Corporation, New Taipei (TW)

( * ) Notice: Subject to any disclaimer, the term of this patent is extended or adjusted under 35 U.S.C. 154(b) by 253 days.

(21) Appl. No.: 13/899,072

(22) Filed: May 21, 2013

(65) Prior Publication Data

US 2014/0167636 A1    Jun. 19, 2014

(30) Foreign Application Priority Data

Dec. 13, 2012    (TW) .............................. 101147086 A

(51) Int. Cl.
*H05B 37/02* (2006.01)
*H05B 33/08* (2006.01)

(52) U.S. Cl.
CPC ........ *H05B 33/0815* (2013.01); *H05B 33/0842* (2013.01); *Y02B 20/346* (2013.01)

(58) Field of Classification Search
CPC .................. H04B 33/0815; H04B 33/0845
See application file for complete search history.

(56) References Cited

U.S. PATENT DOCUMENTS

2002/0130944 A1    9/2002    Ema et al.
2007/0164930 A1*   7/2007    Jeng et al. ...................... 345/39

FOREIGN PATENT DOCUMENTS

| TV | 514866 B | 12/2002 |
| TW | I316694 B | 11/2009 |
| TW | 201134292 A | 10/2011 |

OTHER PUBLICATIONS

Office Action of corresponding TW patent application No. 101147086 issued on Dec. 26, 2014.

* cited by examiner

*Primary Examiner* — Jeffrey Zweizig
(74) *Attorney, Agent, or Firm* — Muncy, Geissler, Olds & Lowe, P.C.

(57) ABSTRACT

An LED driving method is provided. The method includes the steps of: receiving a brightness control signal, wherein the brightness control signal represents a duty cycle of an LED within a pulse width modulation cycle, and the duty cycle is indicated by a plurality of illuminating clocks; dividing the PWM cycle into a plurality of sub-PWM cycles; and equally distributing the illuminating clocks to each of the sub-PWM cycles.

5 Claims, 6 Drawing Sheets

METHOD AND APPARATUS FOR DRIVING LIGHT EMITTING DIODE

CROSS REFERENCE TO RELATED APPLICATIONS

This Non-provisional application claims priority under 35 U.S.C. §119(a) on Patent Application No(s). 101,147,086, filed in Taiwan, Republic of China on Dec. 13, 2012, the entire contents of which are hereby incorporated by reference.

BACKGROUND OF THE INVENTION

1. Field of the Invention

The present invention relates to LED driving technology, and in particular, relates to the driving technology for suppressing LED flickers.

2. Description of the Related Art

Methods for driving LEDs can be classified into two categories: analog driving methods and digital driving methods. The analog driving method adjusts the LED brightness by changing the LED current. However, this method is not precise enough for brightness control, and it may change the LED's light color at the same time. Therefore, most LED products nowadays are driven digitally.

The digital driving method adjusts LED brightness via pulse width modulation (PWM). FIG. 1 shows the relationship between a system clock signal clk and a 4-bit brightness control signal $S_{LC}$. As is well known in the art, 4 bits can be used to represent $2^4$ brightness values. Thus, in FIG. 1, the PWM cycle of the 4-bit brightness control signal $S_{LC}$ (i.e., the total length of the brightness control signal) is identical to 16 illuminating clocks. The pulse width modulation is achieved by varying the duty cycle of the LED (i.e., by varying the duty ratio of the illuminating duration to the whole duration of the signal). With the PWM, the LED brightness can be digitally controlled. From FIG. 1, it can be known that the duty cycle of the brightness control signal SLC is $11/16$, where the pulse width (high level portion in this Figure) has 11 illuminating clocks. In the duration of the aforementioned 11 clocks, the LED is turned on and emits lights. However, in the following 5 clocks, the LED is turned off. The PWM changes the relative lengths of the time that the LED is turned on and off, and thus the brightness of the LED can be adjusted.

Note that when the LED is desired to exhibit low brightness, the number of the continuous non-illuminating pulses which represents that the LED is turned off will increase. Although the PWM cycle is usually extremely short, the LED's winking changes (flickers) will be difficult to be perceived by humans visually; however, they are noticeable when filming the LED through a digital camera having a low image capture rate. Therefore, the present invention provides a digital LED driving technology for reducing flickers.

BRIEF SUMMARY OF THE INVENTION

The present invention provides an LED driving method. The method includes the steps of: receiving a brightness control signal, wherein the brightness control signal represents a duty cycle of an LED within a pulse width modulation cycle (PWM cycle), and the duty cycle is indicated by a plurality of illuminating clocks; dividing the PWM cycle into a plurality of sub-PWM cycles; and equally distributing the illuminating clocks to each of the sub-PWM cycles.

The present invention also provides an LED driving apparatus. The apparatus comprises: a signal receiving unit, for receiving a brightness control signal, wherein the brightness control signal represents a duty cycle of an LED within a pulse width modulation cycle, and the duty cycle is indicated by a plurality of illuminating clocks; a PWM cycle dividing unit, for dividing the PWM cycle into a plurality of sub-PWM cycles; and a clock distributing unit, coupled to the signal receiving unit and the PWM cycle dividing unit, for equally distributing the illuminating clocks to each of the sub-PWM cycles.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

LED Driving Method

Figure 2:
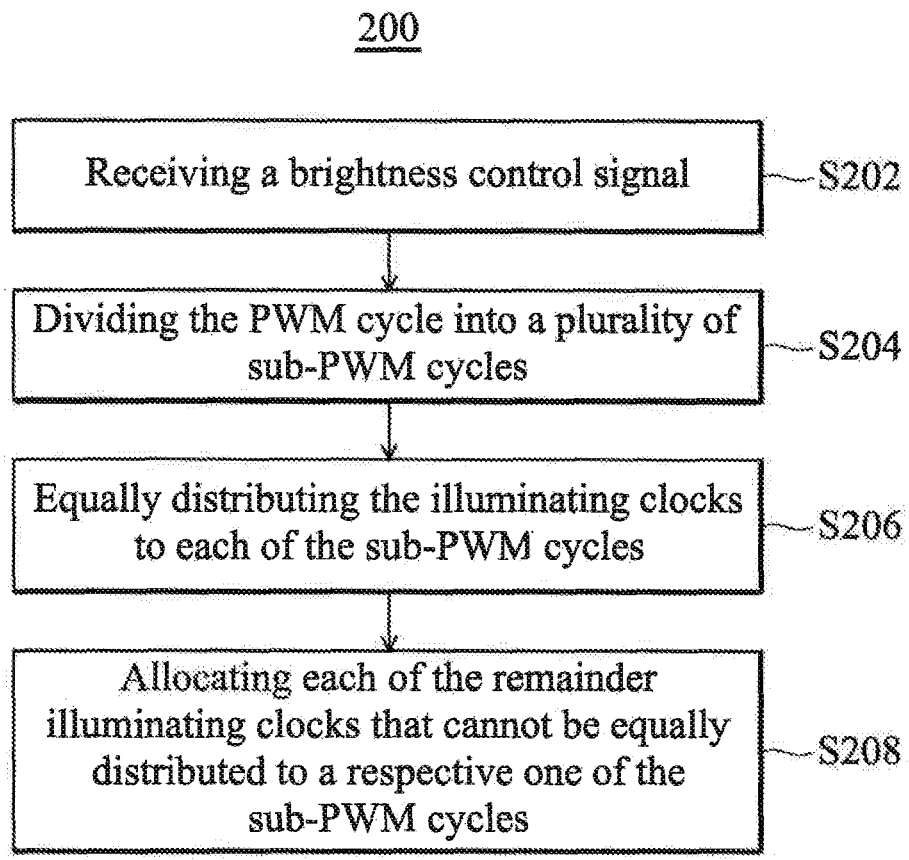
FIG. 2 is a flow chart of an LED driving method according to an embodiment of the invention.
Figure 3A:
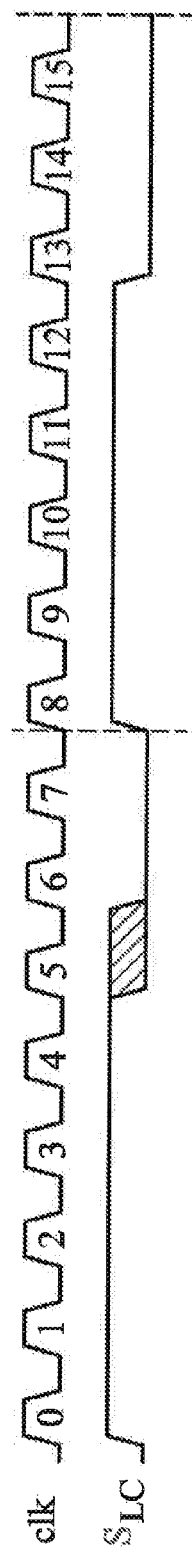
FIGS. 3A, 3B and 3C show the relationship between the clock signal and the new brightness control signals in the embodiments of the present invention.
Figure 3B:
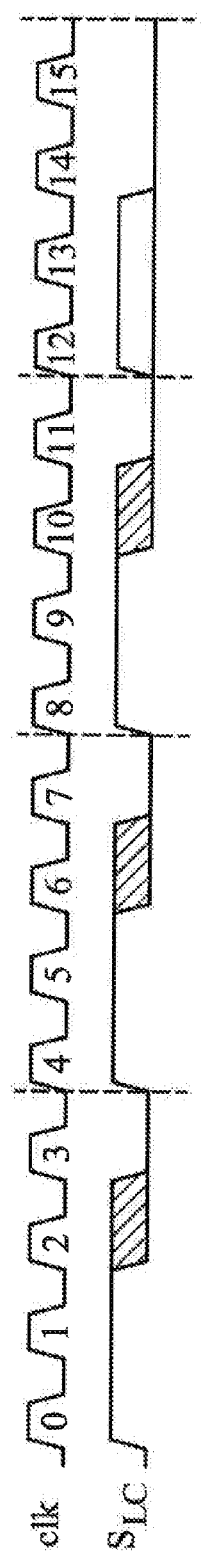
Figure 3C:
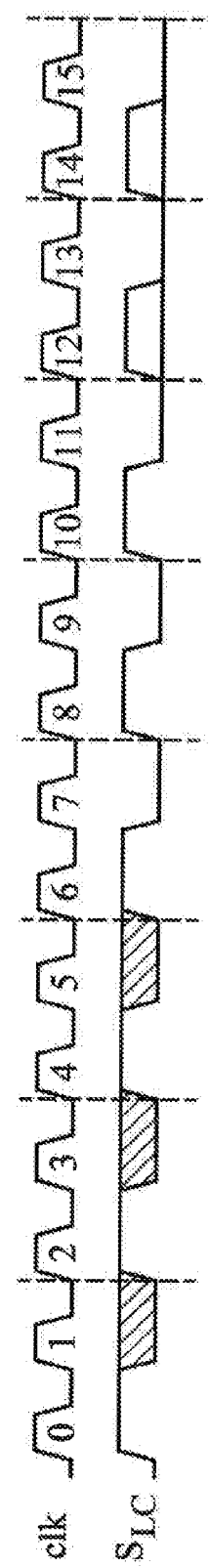

FIG. 2 is a flow chart of an LED driving method according to an embodiment of the invention. The LED driving method 200 includes steps S202~S208, which are set to modify the original brightness control signal and generates a new brightness control signal. FIGS. 3A, 3B and 3C show the relationship between the clock signal and the new brightness control signals in the embodiments of the present invention. The steps of the present invention will be described in accordance with the FIGS. 2 and 3A-3C.

Figure 1:
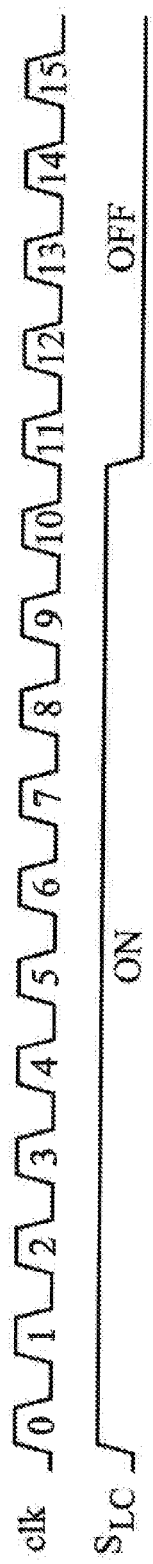
FIG. 1 shows the relationship between a system clock signal clk and a 4-bit brightness control signal $S_{LC}$.

In step S202, the original brightness control signal is received. The brightness control signal represents the duty cycle of the LED within a pulse width modulation cycle (PWM cycle). The duty cycle is indicated by a plurality of illuminating clocks. For the purpose of illustration, the brightness control signal in the present embodiments is a 4-bit signal, and the original brightness control signal and the clock signal are shown in FIG. 1. As shown in FIG. 1, the PWM cycle of the original brightness control signal $S_{LC}$ is equal to 16 clocks, where 11 of them are illuminating clocks, thus the duty cycle of the signal $S_{LC}$ is $11/16$. Note that the brightness control signal with 4 bits and $11/16$ duty cycle is taken for illustration, and the present invention should not be limited thereto. The present invention can be applied to brightness control signals with various bits and various duty cycles.

In step S204, the PWM cycle having 16 clocks is divided into a plurality of sub PWM cycles. The PWM cycle in FIGS. 3A, 3B and FIG. 3C is respectively divided into 2, 4 and 8 sub-PWM cycles.

In step S206, the aforementioned 11 illuminating clocks are equally distributed into the sub-PWM cycles. Finally, each of the remainder illuminating clocks after the illuminating clocks have been equally distributed into the sub-PWM cycles are allocated to a respective one of the sub-PWM cycles in step S208. In other words, when the duty cycle is indicated by P illuminating clocks, and the PWM cycle is divided into Q sub-PWM cycles, the number of the illuminating clocks that are equally distributed to each of the sub-PWM cycles is the quotient of P divided by Q, and the number of the illuminating clocks that cannot be equally distributed to each of the sub-PWM cycles is the remainder of P divided by Q.

In the embodiments of FIG. 3A, the new brightness control signal has 2 sub-PWM cycles. Since the quotient of 11 divided by 2 is 5, each sub-PWM cycle is equally allocated with 5 illuminating clocks. Since the reminder of 11 divided by 2 is 1, the remainder illuminating clock (hatched portion in FIG. 3A) can be allocated to any one of the two sub-PWM cycles. In the embodiments of FIG. 3B, the new brightness control signal has 4 sub-PWM cycles. Since the quotient of 11 divided by 4 is 2, each sub-PWM cycle is equally allocated with 2 illuminating clocks. Since the reminder of 11 divided by 4 is 3, each of the remainder 3 illuminating clocks (hatched portion in FIG. 3B) can be allocated to a respective one of the 4 sub-PWM cycles. In the embodiments of FIG. 3C, the new brightness control signal has 8 sub-PWM cycles. Since the quotient of 11 divided by 8 is 1, each sub-PWM cycle is equally allocated with 1 illuminating clock. Since the reminder of 11 divided by 8 is 3, each of the remainder 3 illuminating clocks (hatched portion in FIG. 3B) can be allocated to a respective one of the 4 sub-PWM cycles.

Note that in FIGS. 3A-3C, the remainder light-emitting pulses are allocated to each sub-PWM cycle in accordance with the sequence of the sub-PWM cycle, however, in other embodiments the present invention should not be limited thereto, and the remainder light-emitting pulses can be randomly allocated to each sub-PWM cycle.

In addition to the LED driving method described above, the present invention further provides an LED driving apparatus.

LED Driving Apparatus

Figure 4:
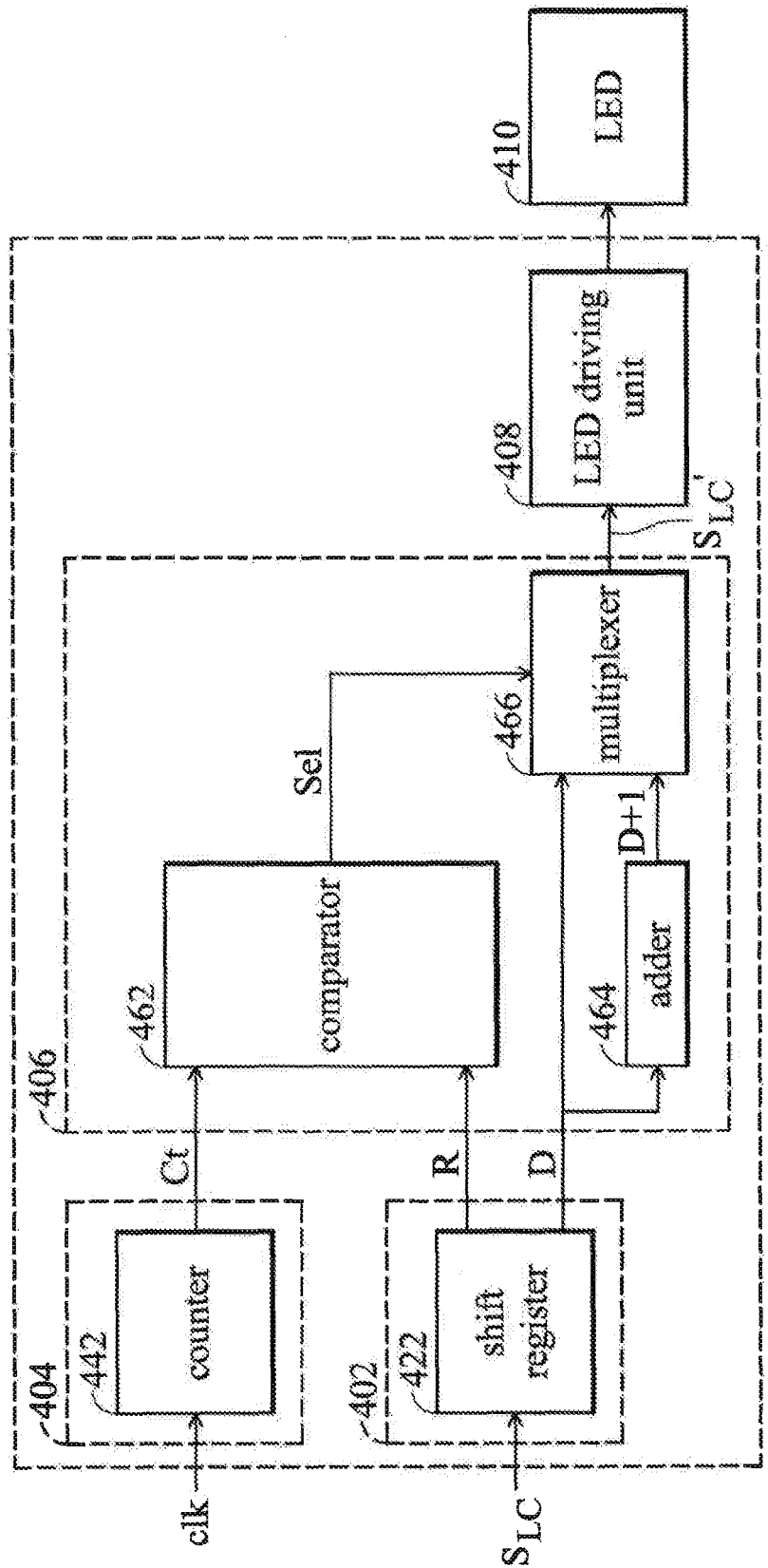
FIG. 4 is a schematic diagram of the LED driving apparatus according to an embodiment of the present invention.
Figure 5:
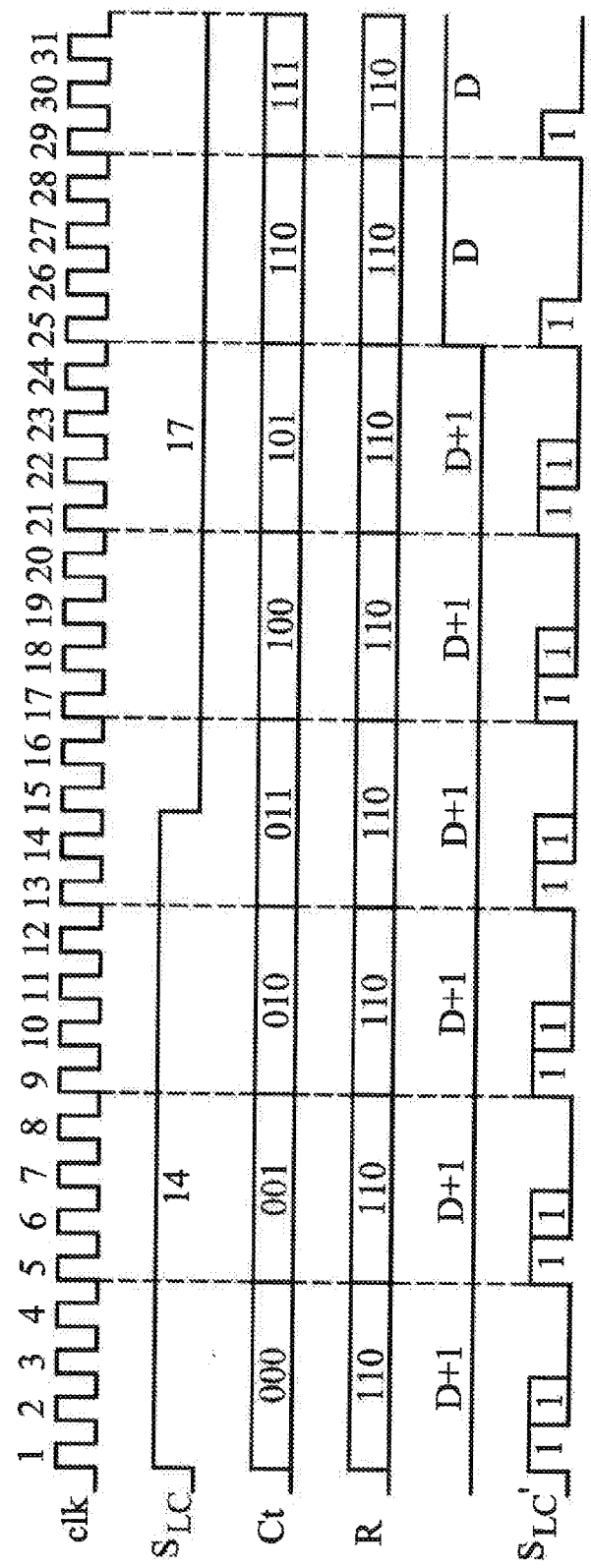
FIG. 5 is a timing diagram of the signals in the LED driving apparatus.

FIG. 4 is a schematic diagram of the LED driving apparatus according to an embodiment of the present invention. FIG. 5 is a timing diagram of the signals in the LED driving apparatus. The LED driving apparatus of the present invention 400 includes: a signal receiving unit 402, a PWM cycle dividing unit 404 and a clock distributing unit 406. The LED driving apparatus of the present invention 400 is used to perform the steps 202, 204 and 206-208 of the LED driving method 200, and can generate a new brightness control signal $S_{LC}'$ for driving the LED 410. Note that the present embodiment uses 31 clocks to represent 32 ($2^5$) values of brightness (from the minimum [00000] to the maximum [11111]). For the purpose of illustration, the brightness control signal $S_{LC}$ in the present embodiment has a brightness value of 15 (i.e., [01110]), and includes 14 illuminating clocks and 17 non-illuminating clocks, as shown in FIG. 5.

The PWM cycle dividing unit 404 of the present invention is coupled to the signal receiving unit 402 for dividing the PWM cycle into a plurality of sub-PWM cycles. In the embodiment of FIG. 4, the PWM cycle dividing unit 404 can use a counter 442 to simulate the diving operation of the PWM cycle. Specifically, if it is desired to divide the PWM cycle into 8 sub-PWM cycles, the counter 442 should be a mode-8 counter (i.e., a $2^N$ counter with N=3). The mode-8 counter 442 can receive the clock signal clk and count the number of the clocks. For example, the counting value starts from [000] and resets to [000] when the counting is amounted up to [111], as shown in FIG. 5.

The signal receiving unit 402 of the present invention can be used to receive an original brightness control signal $S_{LC}$, which represents a duty cycle of an LED within a pulse width modulation cycle (PWM cycle). The duty cycle is indicated by a plurality of illuminating clocks. In an embodiment, as shown in FIG. 4, the signal receiving unit 402 of the present invention further includes a shift register 422. Specifically, for receiving a 5-bit brightness control signal $S_{LC}$, the shift register 422 should be a 5-bit shift register. In this embodiment, the brightness value 15 of the brightness control signal $S_{LC}$ is recorded as [D+R]=[01110] by the shift register 422, where the value of D is the first two bits [01] and the value of R is the last three bits [110] (the same number of bits with the counter 442). Note that in the present invention the number of the illuminating clocks 14 is divided by the number of the sub-PWM cycles 8, and the value of D and the value of R are respectively the quotient 1 and reminder 6. The settings of the value of D and the value of R are advantageous for the clock distributing unit 406 to perform calculations, which will be described in the following.

The clock distributing unit 406 of the present invention is coupled to the signal receiving unit 402 and the PWM cycle dividing unit 404, and is used to equally distribute the illuminating clocks to each of the sub-PWM cycles, and allocates each of the remainder illuminating clocks that can not be equally distributed, to a respective one of the sub-PWM cycles. In FIG. 4, the clock distributing unit 406 of the present invention includes a comparator 462, an adder 464 and a multiplexer 466. The comparator 462 is used to compare the R value with the counting value Ct outputted from the mode-8 counter 422. When the R value [110] is greater than the counting value Ct, a control signal Sel with a low state is generated. When the R value [110] is not greater than the counting value Ct (smaller than or equal to the counting value Ct), the control signal Sel with a high state is generated. The adder 464 is used to generate a value of D+1 (i.e., 2 in this example), and the multiplexer 466 can select the value of D or the value of D+1 according to the control signal Sel from the comparator 462. Thus, for the first 6 sub-PWM cycles, the control signal Sel is in the low state and the multiplexer 466 selects the value of D+1 and outputs two illuminating clocks to each of them. And, for the last 2 sub-PWM cycles, the control signal Sel is in the high state and the multiplexer 466 selects the value of D and outputs one illuminating clock to each of them. Thus a new brightness control signal $S_{LC}'$ which has the same brightness value with the original brightness control signal $S_{LC}$, is generated. Then, in the present embodiment, the brightness control signal $S_{LC}'$ outputted by the clock distributing unit 406 of the present invention can be used to control an LED driving unit 408 to drive the LED 410.

With the LED driving technology described above, the new brightness control signal helps the LED to maintain the same brightness, but significantly shortens the time intervals in which the LED does not emit light, thus reducing unnecessary flickers.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An LED driving apparatus, comprising:
   a signal receiving unit, for receiving a brightness control signal, wherein the brightness control signal represents a duty cycle of an LED within a pulse width modulation cycle, and the duty cycle is indicated by a plurality of illuminating clocks;
   a PWM cycle dividing unit, for dividing the PWM cycle into a plurality of sub-PWM cycles; and
   a clock distributing unit, coupled to the signal receiving unit and the PWM cycle dividing unit, for equally distributing the illuminating clocks to each of the sub-PWM cycles.

2. The LED driving apparatus as claimed in claim 1, wherein the clock distributing unit further allocates the remainder illuminating clocks that cannot be equally distributed to a respective one of the sub-PWM cycles.

3. The LED driving apparatus as claimed in claim 1, wherein the signal receiving unit further comprises:
   a shift register, for recording N bits of the brightness control signal, wherein the N bits include first D bits and last R bits of the brightness control signal, and the first D bits represents a value of D and the last R bits represents a value of R.

4. The LED driving apparatus as claimed in claim 1, wherein the PWM cycle dividing unit further comprises:
   a counter, for cyclically generating a counting value with a cycle being two to the power of n, wherein n is equal to the number of bit of the value of R.

5. The LED driving apparatus as claimed in claim 4, wherein the clock distributing unit further comprises:
   a comparator, for comparing the value of R and the counting value to generate a control signal, wherein when the value of R is greater than the counting value, the control signal is in a first state, and when the value of R is not greater than the counting value, the control signal is in a second state; and
   a multiplexer, for allocating D+1 illuminating clocks to each of the sub-PWM cycles when the control signal is in the first state, and allocating D illuminating clocks to each of the sub-PWM cycles when the control signal is in the second state.

* * * * *